United States Patent [19]
Storberg

[11] Patent Number: 4,612,481
[45] Date of Patent: Sep. 16, 1986

[54] LINEARITY CORRECTION CIRCUIT

[75] Inventor: David G. Storberg, Lino Lakes, Minn.

[73] Assignee: CPT Corporation, Minneapolis, Minn.

[21] Appl. No.: 625,039

[22] Filed: Jun. 27, 1984

[51] Int. Cl.$^4$ .............................................. H01J 29/56
[52] U.S. Cl. ..................................... 315/370; 315/408
[58] Field of Search ......................... 315/370, 408, 399

[56] References Cited

U.S. PATENT DOCUMENTS

| | | |
|---|---|---|
| 2,900,565 | 8/1959 | Moore . |
| 3,310,705 | 3/1967 | Nicholson . |
| 3,319,111 | 5/1967 | Denton . |
| 3,319,112 | 5/1967 | Annus et al. . |
| 3,319,113 | 5/1967 | Denton . |
| 3,398,318 | 8/1968 | Bazin . |
| 3,427,496 | 2/1969 | Wood . |
| 3,795,835 | 5/1974 | Aldrich et al. . |

Primary Examiner—Theodore M. Blum
Attorney, Agent, or Firm—Dorsey & Whitney

[57] ABSTRACT

A linearity correction circuit for high speed horizontal scanning is disclosed. The correction circuit uses high speed, fast recovery components capable of operating in the fifty to one hundred kilohertz range. A variable inductor is tapped directly to the flyback transformer, the variable nature of the inductor giving a range of correction for linearity. The inductor is connected to a capacitor and a damper diode with a diode so that the voltage built up across the capacitor, which is connected to the deflection coil, causes the damper diode to conduct early, thus correcting linearity of the circuit. Using a minimum number of components a highly efficient circuit is provided both in operation and cost of construction.

11 Claims, 3 Drawing Figures

LINEARITY CORRECTION CIRCUIT

BACKGROUND OF THE INVENTION

The field of the invention is horizontal scanning circuits for cathode ray tubes and particularly linearity correction circuits for horizontal scanning.

Because of non-linearity inherent in horizontal scanning circuits an uncorrected horizontal deflection circuit causes images displayed on the CRT to be expanded on the left side of the display. Inventive activity has been applied to this problem resulting in a number of patented resistor-capacitor (RC) circuits and inductor-capacitor (LC) circuits which are adequate to correct linearity at normal operating rates of conventional CRT scanning circuits.

Conventional circuits normally require a secondary transformer associated with the flyback transformer. The secondary transformer is normally connected to LC circuits of various configurations such that the LC circuit is series resonant to maximize the energy across a capacitor, the charge on which is used to correct linearity.

At much higher operating speeds additional considerations are required. The higher operating speed requires consideration of component values necessary to achieve linearity with an adequate control range. In addition, care must be taken that the coil used in the linearity circuit does not overheat because of the high speed operation.

SUMMARY OF THE INVENTION

The disclosed invention is a linearity correction circuit which addresses each of those problems that may arise during high speed operation. The invention is achieved with a minimum of coponents which are particularly selected for high speed operation.

A variable inductor is tapped directly off of the primary winding of the flyback transformer. The range of variation of the inductor is selected to give an adequate range of control of linearity to the circuit. A high speed diode is utilized which is connected to the variable inductor, to the damper diode, and to a capacitor connected to the deflection coil, the parameter values being such that the capacitor is charged to a sufficient value to cause the damper diode to conduct at the proper time to compress the left side of the display for linearity correction.

It is an object of the invention to increase the efficiency of linearity correction circuits by eliminating coupling losses.

It is an object of the invention to increase the efficiency of construction of linearity circuits by reducing the number of components required for a linearity correction circuit.

It is an object of the invention to provide a linearity correction circuit for high speed horizontal scanning.

These and other objects and advantages of the invention will become obvious to those skilled in the art upon review of the enclosed drawing and accompanying description.

DESCRIPTION OF THE PREFERRED EMBODIMENT

Figure 1:
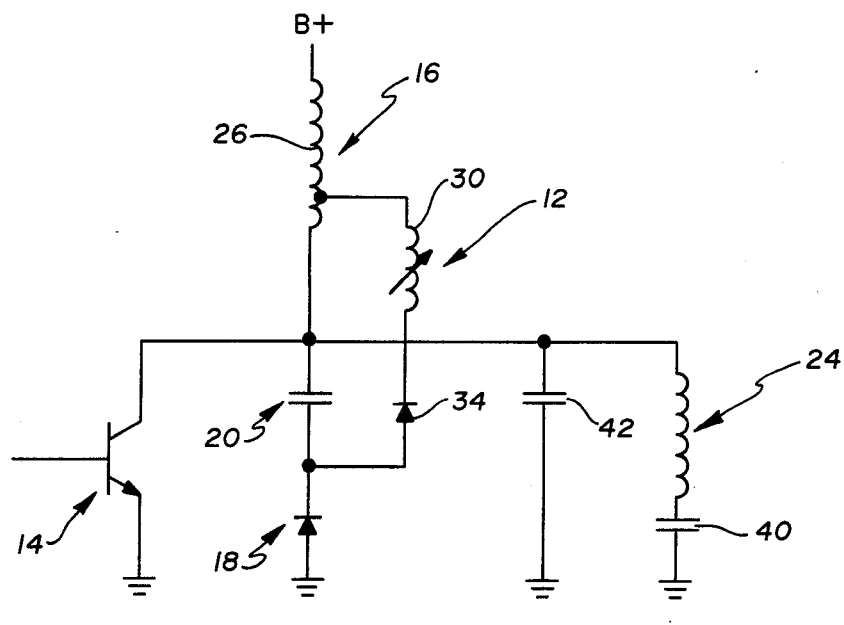
FIG. 1 is a schematic diagram of a horizontal deflection circuit showing how the components of the linearity correction circuit are incorporated therein.
Figure 2:
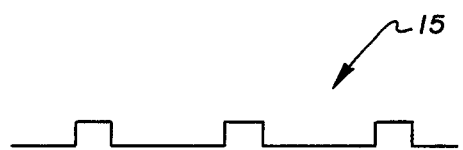
FIG. 2 is the input signal to the horizontal drive transistor.

FIG. 1 illustrates the horizontal deflection circuit and how the linearity correction circuit 12 of the instant invention is achieved.

An output drive transistor 14 is connected between ground and the flyback transformer 16. A conventional input signal 15 is connected to the drive transistor at the scanning rate of the circuit. A damper diode 18 is also connected through capacitor 20 to the flyback transformer 16 and the horizontal deflection coil 24 of the Cathode Ray Tube (CRT) is connected to the collector of the output drive transistor 14.

The linearity correction circuit 12 of the instant invention is tapped directly to the primary winding 26 of the flyback transformer 16. By connecting the circuit 12 directly to a tap on the primary winding 26, coupling losses are eliminated. In addition, the labor costs of providing a secondary winding and insulating the secondary winding from the primary winding 26 are eliminated as well. The linearity correction circuit 12 includes a variable inductor 30 which is sized in conjunction with the capacitor 20 to give an adequate control range for linearity correction. Connected to the inductor is a metal silicon-type Schottky diode 34 with a sufficiently fast recovery time to operate in the range of operation of Applicant's invention, that is between fifty and one hundred kilohertz. A preferred operating frequency of Applicant's scanning circuit is in the range of sixty-four kilohertz.

The diode is connected to the junction of the damper diode 18 and the capacitor 20. The other plate of the capacitor 20 is connected to the junction of the collector of the output transistor 14, the flyback transformer 26 and the horizontal deflection yoke 24, so that the charge on the capacitor 20 causes the damper diode 18 to conduct early to provide the required linearity correction.

The capacitor 20 is sized such that the time constant resulting from its 20 series connection with the deflection yoke 24 causes the residual charge on the capacitor 20 to disappear at about the time the damper diode 18 is ready to cease conduction. The inductor 30 is sized to limit or control the amount of current delivered to the capacitor 20 in the period of time of conduction of diode 34 which permits the charge to build up on the capacitor 20 to the point necessary to achieve linearity correction of the trace.

The damper diode 18 is also preferably a faster recovery diode than conventionally used in horizontal deflection circuits to provide for fast forward operation at the operating speed of the scanning circuit.

As is conventionally done, a correction capacitor 40 is connected in series with the deflection yoke 24 and a tuning capacitor 42 is connected across the deflection yoke 24.

Components found suitable for a preferred embodiment of the linearity circuit of the instant invention are as follows.

| Component | Component Value | Mfgr's Designation |
|---|---|---|
| Variable Inductor | 3–12μH | Custom coil #3443 |
| High Speed Diode | | Motorola 1N5821 |
| Linearity Correction Capacitor | .68μf. 63UDC. 40VAC. Polycarbonate | WIMA MKC-4 |
| Damper Diode | | VARO TG26 |

In operation, during retrace time, the potential on the collector of the output transistor 14 is at approximately five hundred volts. At the tap point on the primary winding 26 of the flyback transformer 16 the potential is approximately four hundred eighty-five to four hundred ninety volts. Therefore, it is slightly more negative than the collector.

The linearity correction diode 34, therefore, will conduct and will cause the bottom of the capacitor 20 to become slightly more negative than the output pulse. The lower side of the capacitor 20 will assume a voltage of about ten to twenty volts less positive than the collector of the horizontal output transistor 14. The inductor 30, as adjusted, limits the amount of charge delivered to the capacitor 20 during the charging time.

When the retrace pulse starts to fall, which means the yoke current is reversed and is starting to build in the opposite direction, the diode 34, which is in series with the adjustable inductor 30, will be cut off, leaving a charge on the linearity correction capacitor 20.

Figure 3:
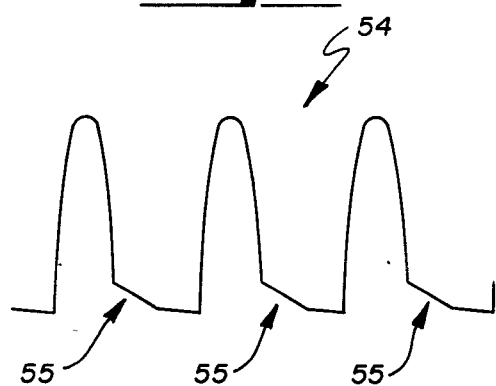
FIG. 3 is the output signal, as corrected by the linearity correction circuit of FIG. 1, as applied to the horizontal deflection coil.

As the yoke current reverses and builds up to the predetermined maximum value, the damper diode 18 will conduct. It will conduct, however, when its junction with the capacitor 20 goes to a diode drop below ground. In other words, the collector of the horizontal output transistor 14, to which the horizontal deflection yoke 24 is tied, is still above ground by the charge on the capacitor 20 when the damper diode 18 fires. Therefore, the damper diode 18 effectively fires early, prior to the time the yoke current has risen to an equivalent value. This produces the output trace 54 with linearity correction 55 shown in FIG. 3.

The resulting signal 54 compresses the trace on the left side of the screen to provide the required correction of linearity.

An advantage of the disclosed linearity correction circuit 12 is that all components 20, 30, 34, in the circuit operate at substantially the same potential. This enables the use of components for inductor 30, recovery diode 34, and capacitor 20 which require only a voltage range of ten to twenty volts. The resulting circuit is one that is extremely efficient in operation and less costly to construct than more conventional linearity correction circuits.

In general, while a specific embodiment of the invention has been described, it is to be understood that this is for purpose of illustration only and that modifications can be made within the scope of the invention and that such modifications are within the intendment of the invention as defined by the following claims.

I claim as my invention:

1. A linearity correction circuit for a high speed horizontal deflection circuit which causes horizontal traces and retraces to occur on a cathode ray tube, the deflection circuit having a horizontal output transistor, a flyback transformer, said flyback transformer having a primary winding and one or more secondary windings, a damper diode, and a horizontal deflection coil for the cathode ray tube, the linearity correction circuit comprising:

an inductor tapped directly to the primary winding of the flyback transformer;

a linearity correction capacitor connected in series with the damper diode and to the junction of the collector of the horizontal output transistor, the flyback transformer and to the horizontal deflection coil on the cathode ray tube so that the charge on the capacitor provides additional energy to correct linearity of the trace; and a high speed diode connected in series with the inductor and to the junction of the linearity correction capacitor and the damper diode to charge the capacitor during retrace.

2. The linearity correction circuit of claim 1 wherein the inductor is a variable inductor so that a range of linearity correction can be achieved with the linearity correction circuit.

3. The linearity correction circuit of claim 1 wherein the component value of the inductor and the capacitor are selected to provide a predetermined charge on the capacitor during retrace.

4. The linearity correction circuit of claim 1 wherein the inductor, capacitor and diode are low voltage components each having a potential across them in the range of ten to twenty volts.

5. The linearity correction circuit of claim 1 wherein the component value of the inductor is in the range of approximately three to twelve microhenrys.

6. The linearity correction circuit of claim 2 wherein the variable inductor is variable to provide an inductance which varies between three and twelve microhenrys.

7. The linearity correction circuit of claim 1 wherein the component value of the capacitor is approximately 0.68 microfarads.

8. The linearity correction circuit of claim 1 wherein the difference in potential between the tap on the primary winding on the flyback transformer and the end of the primary winding of the flyback transformer to which the capacitor is connected is approximately ten to twenty volts.

9. The linearity correction circuit of claim 1 wherein the component values are selected to have an operating frequency in the range of fifty to one hundred kilohertz.

10. The linearity correction circuit of claim 8 wherein the components are selected to have an operating range in the sixty-four kilohertz range.

11. The linearity correction circuit of claim 1 wherein the high speed diode comprises a metal silicon Schottky diode.

* * * * *